Aug. 4, 1959

T. N. FLIGHT ET AL 2,898,544

TEMPERATURE CONTROL DEVICE

Filed Jan. 20, 1956

2 Sheets-Sheet 1

INVENTORS
Theodore N. Flight &
George R. Shepherd
BY
Pennie Edmonds Morton Barrows & Taylor
ATTORNEYS Aug. 4, 1959     T. N. FLIGHT ET AL     2,898,544
TEMPERATURE CONTROL DEVICE
Filed Jan. 20, 1956     2 Sheets-Sheet 2
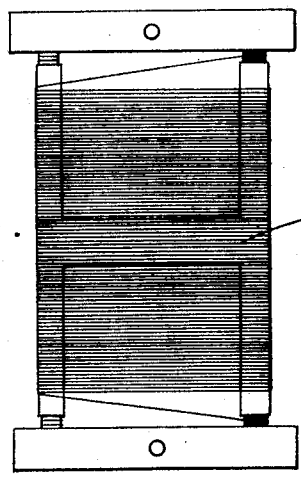
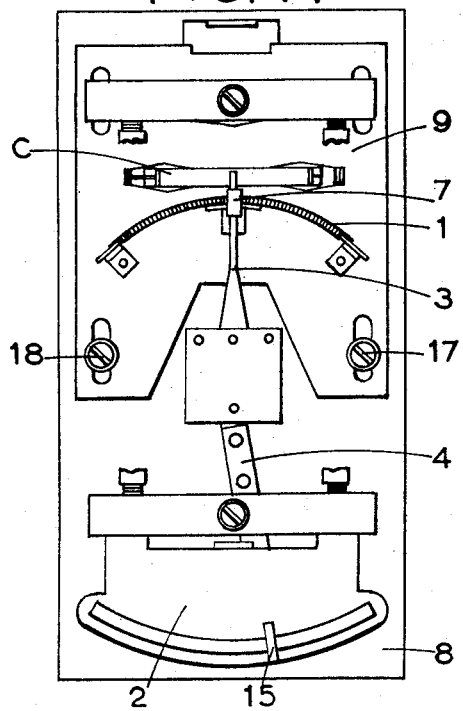
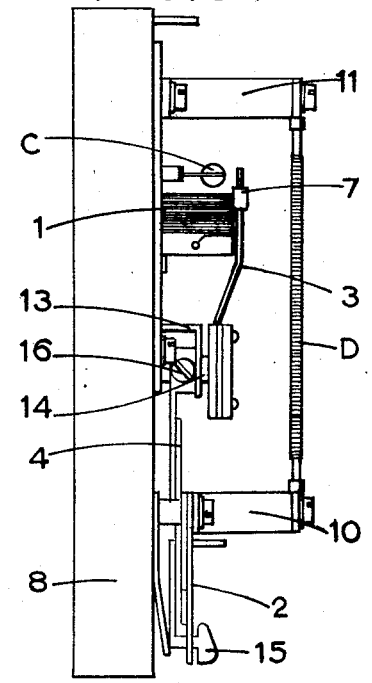
INVENTORS
Theodore N. Flight 2nd
George R. Shepherd
BY
Pennie Edmonds Morton Barrows & Taylor
ATTORNEYS

United States Patent Office 2,898,544
Patented Aug. 4, 1959

2,898,544

TEMPERATURE CONTROL DEVICE

Theodore N. Flight and George R. Shepherd, Farnham Common, England, assignors to The Rheostatic Company Limited, Slough, England, a British company Application January 20, 1956, Serial No. 560,450

Claims priority, application Great Britain January 20, 1955

1 Claim. (Cl. 323—69)

This invention is concerned with the construction and adjustment of a temperature sensitive element for use in conjunction with an electronic temperature control system.

Such a temperature sensitive element usually consists of an open winding of fine wire mounted within a protecting case for location in the space, the temperature of which is to be controlled.

The object of this invention is to provide such a temperature sensitive element in which provision is made to compensate for electrical variations in the component parts by the provision of calibration and scale adjustment features in the construction.

In this invention such a resistance is mounted on a base together with a second resistance, each forming one arm of a bridge network, the remaining two arms of the bridge being mounted in the control box which may be remotely located. On the same base is mounted a balancing and regulating resistance forming the junction between the temperature sensitive arm and the second arm.

Figure 1:
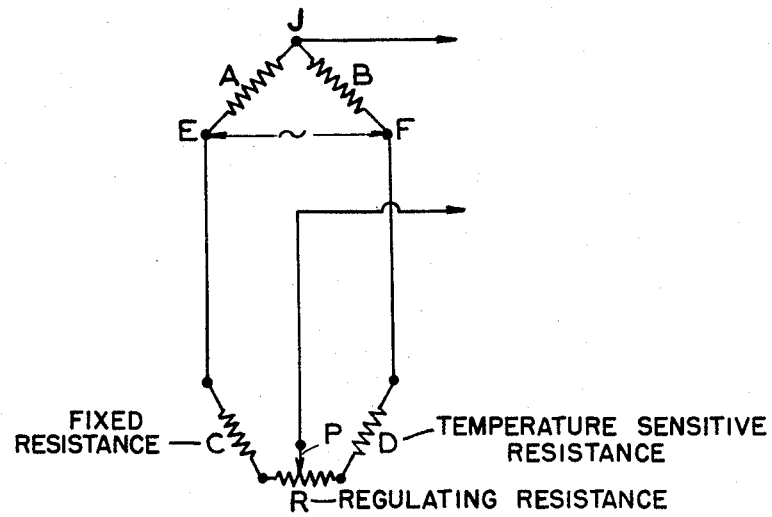
Figure 2:
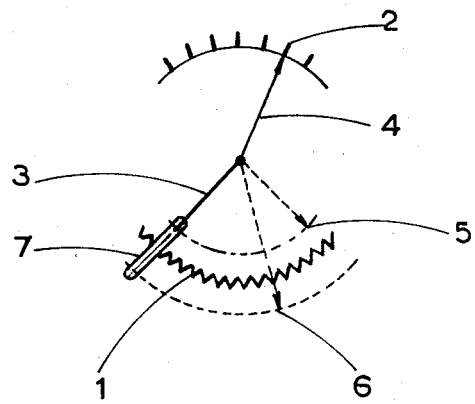

The invention is illustrated in the accompanying drawings in which Figure 1 is a diagram of the resistances and their interconnections forming the temperature sensitive bridge network of the invention. Figure 2 is a diagrammatic representation of the arrangement of the calibrating and regulating resistance. Figures 3, 4 and 5 illustrate a construction of the device showing the mounting and the adjustment means of the resistance on the base, Figure 3 showing the temperature sensitive element detached, Figure 4 a plan view of the device with the temperature sensitive element removed and Figure 5 a side elevation of the device.

Referring to Figure 1, A and B indicate two resistance arms of a bridge mounted adjacent an electronic amplifier (not shown). C is an invariable resistance assumed to be mounted together with the temperature sensitive arm D and the interconnecting regulating resistance R on a common base support for installation in the space to be controlled. An alternating current supply is connected across EF. Points J and P (across which any out of balance of the bridge produces a voltage) are connected to the electronic amplifier (not shown).

The connection P is in the form of a slider movable on the regulating resistance R. Movement of the point P from the centre position will affect the balance of the bridge network and, as the resistance of D is temperature sensitive, such movement of the point P serves to determine the temperature at which the bridge will balance.

Referring to Figure 2, there is shown the resistance 1 corresponding to resistance R of Figure 1 with slider contact 7 corresponding to slider P of Figure 1 carried on an arm 3, which is attached to a second arm 4 which carries indicating means movable over a temperature scale 2. The angular disposition between arms 3 and 4 is made variable so that calibration against a fixed temperature of a complete bridge network may be made by first setting the arm 4 against the calibration temperature, then moving the slider 7 over the resistance 1, until the bridge is balanced and finally locking arms 3 and 4 together.

In the manufacture of the resistance 1 slight variation in the resistance per unit length of the wire used or variation in the winding pitch, will lead to varying rates of resistance change with movement against the scale 2.

In the present invention compensation for such a change is provided by making the radius at which the resistance 1 is fixed, variable relative to the pivot point of the arms 3 and 4 as is shown by dotted lines at 5 and 6 in Figure 2. It will be seen that, for a given angular movement of the arm 4 over the scale 2, with the resistance 1 fixed at the radius 5, the linear travel of the slider contact 7 and therefore the resistance change, will be less than when the resistance is fixed at radius 6. It should be noted that Figure 2 is not drawn to scale. The necessary difference between the radii indicated by 5 and 6 in practice would be much smaller than here drawn.

Referring to the construction of the device shown in Figures 3, 4 and 5 in which certain numerals and reference characters used in Figure 1 and for Figure 2 are used to indicate like points, 8 indicates a base on which are fixed a temperature scale 2 and a spindle supporting bracket 13, thermosensitive element supporting posts 10, 11 and a sub-base 9. A spindle 14 mounted on the supporting bracket 13 carries the arm 3 and the wiping contact 7. The temperature adjustment arm 4 with its pointer 15 movable over the scale 2 is also mounted on the spindle 14.

The angular relation between arm 3 and the adjustment arm 4 can be varied by the rotating arm 3 on the spindle 14 and following the calibration by locking the arm 3 on the spindle by means of a screw 16. The resistance 1 on which the sliding contact 7 rests is mounted on the sub-base 9 which is clamped to the main base 8 by means of screws 17—18 engaging slots in the sub-base.

Compensation for manufacturing variations of the resistance 1 is effected by varying the radius of the resistance 1 from the spindle 14 by releasing the screws 17—18 and sliding the sub-base 9, and with it the resistance 1, to such a position as to give the desired resistance variation with movement of the slider 7. The sub-base 9 is then locked to the main base 8.

The fixed resistance C is also carried by sub-base 9 and the temperature sensitive element D is mounted on posts 10—11 on the base 8.

We claim:

A temperature control device comprising a base, a temperature sensitive resistance element, two non-temperature sensitive resistance elements, all of said resistance elements being mounted on the base, a contact slidable on one of said two resistance elements and movable around a pivot point, one end of said one resistance element having the sliding contact being connected to one end of the temperature sensitive resistance element and its other end being connected to one end of the other of said two resistance elements, the position of said one resistance element having the sliding contact relative to the pivot point of the sliding contact being adjustable to vary the effective radius of operation of the sliding contact, and adjustment means for said one resistance element having the sliding contact for varying the effective radius of operation of the sliding contact thereon.

References Cited in the file of this patent

UNITED STATES PATENTS

| | | |
|---|---|---|
| 1,704,153 | Stoekle | Mar. 5, 1929 |
| 2,557,224 | Hornfeck | June 19, 1951 |
| 2,621,275 | Nielsen et al. | Dec. 9, 1952 |
| 2,635,225 | Hadady | Apr. 14, 1953 |